Patented May 16, 1933

1,908,945

UNITED STATES PATENT OFFICE

STEFAN BAKONYI, OF DESSAU, GERMANY, ASSIGNOR TO DEUTSCHE HYDRIERWERKE AKTIENGESELLSCHAFT, OF BERLIN-CHARLOTTENBURG, GERMANY

BIOCHEMICAL FERMENTATION PROCESS

No Drawing. Application filed March 28, 1931. Serial No. 526,139.

The present invention relates to biochemical processes, more especially to processes of conducting fermentation.

The invention provides an improved process in which the propagation of the bacteria and the fermentation are carried on separately and in the preferred embodiment the fermentation is carried on in a plurality of stages by a process involving the addition of fresh bacteria after partial fermentation.

The invention has been evolved in connection with the development of a process for producing commercially butyl alcohol, or butanol, and acetone by fermentation of saccharine material, such as cane sugar molasses, with butylobacter bacteria, and for the purposes of illustration of the principles of the invention such process will be more particularly described, but it will be understood that the particular description is illustrative merely and is not intended as defining the limits of the invention.

During the course of the development of the process to be more particularly described, it has been found that natural mixed bacteria selected and propagated as hereinafter set forth are to be preferred to pure or symbiotic cultures. By symbiotic culture is meant a culture containing two or more species of bacteria which are not mutually inhibitory and which mutually contribute to the same result. A suitable mixture of bacteria may be obtained, for example, from a natural carrier such as parts of plants, humus, manure, etc.

Particularly effective inciters of biochemical action may be obtained by systematic selection and propagation of organisms in nutrient media in the presence of small quantities of the substances to be exclusively or chiefly produced, as, for example, butyl alcohol and acetone in the process selected for particular description. The concentration of the substances in the nutrient media should be, for example, about 1%, and such that the substances will not be consumed as nutrients by the bacteria while at the same time inhibiting the propagation and development of bacteria not resistant to the substances.

To prepare the desired culture mixtures of bacteria are incubated in said nutrient media in separate lots for about 24 hours at temperatures up to 70° C., but preferably at temperatures between 28 and 38° C. After 24 hours each lot subjected to the preliminary fermentation for the moment form an undifferentiated mixture of micro-organisms resistant to the fermentation product.

The next step consists in selecting by examination under the microscope the best of the lots, all those being discarded in which a considerable number of strongly degenerated (granulated or deformed) individuals are found. Only the samples in which the micro-organisms show good protoplasma and normal shape are chosen for further development, these two characteristics proving that the different bacteria are at least compatible. The selected samples may be advantageously further examined, preferably using fixed and colored preparation, to preserve only the best samples. The samples to be further propagated are those in which the micro-organisms show fixation to the solid nutrient substrata and formation of culture. Agar plates may be used if desired. Of course, as will be obvious to one skilled in the art, if a symbiotic culture is desired, it will be necessary to utilize a plurality of colonies from the agar plate as the inoculum if this mode of selection is employed.

Sterilized nutrient substrata containing about 1% of the proposed fermentation product is then inoculated with the selected samples. The inoculated samples are again incubated for 24 hours, whereupon the above described selection by examination under the microscope is repeated. Heating of the samples in connection with methods used in the isolation of bacteria should be avoided, as it has been found that the most important non-sporiferous forms of bacteria are killed by heat and the formation of cultures is prevented.

The foregoing propagating and selecting operations are repeated until cultures of satisfactory normal appearance showing strong attachment to particles in the substrata are obtained.

If it is found desirable further selection may be made using fermentation experiments and selecting for further propagation the samples showing the desired activities and results.

The desired culture having been suitably selected and developed a seed mash is prepared. To this end the bacteria are propagated in a mash which may be of amylaceous material, such as maize or potatoes gelatinized by boiling and cooling to the desired temperature, preferably to 28 to 38° C. In some cases it may be desirable to add to this mash approximately 1% of a mixture of the products to be produced, as butyl alcohol and acetone. If a maize mash is used acetone alone may be added as the selection agent to inhibit the propagation of bacteria not resistant to the butyl alcohol and acetone to be produced.

The resultant seed mash may be used to ferment either amylaceous or saccharine materials. If an amylaceous mash is to be fermented it may be considered desirable to remove the nutrient matter therefrom. This may be accomplished by any of the well known means. For example, there might be employed the method of purifying corn starch described in Walton's Comprehensive Survey of Starch Chemistry, Vol. I, pp. 130–138, in which the corn is steeped, ground, degerminated, "tabled" to remove gluten, and finally dried.

The present invention has perhaps its most valuable commercial application in the fermentation of saccharine materials such as cane sugar molasses including blackstrap, and such application will be more particularly described for the purposes of disclosure and to illustrate the principles involved.

The seed mash containing the bacteria and nutrients for propagation provides a simple procedure for initiating the propagation of the bacteria in the dilute mash. Ordinarily the desired nutrients, including albumen, phosphates and the like, may be contained in the seed mash.

The fermentation of a molasses mash by means of the butylobacter bacteria to produce butyl alcohol and acetone, for example, may be described as conducted in three steps.

*First.*—A relatively large volume of a dilute molasses mash, for example one of which the sugar content is 2 or 3%, is inoculated by adding seed mash thereto and the bacteria of the seed mash are propagated therein, preferably at a temperature between 28 and 38° C., until they attain a high virility. Examination for maximum development of the bacterial mass may be made in any manner desired, for example when the mash shows its greatest acidity the bacilli are gram positive. It may be considered desirable to sterilize this mash or to add 1% of butyl alcohol and acetone to inhibit propagation of undesired bacteria.

When the seed mash containing the bacteria, and ordinarily containing nutrients, has been added to the dilute mash the propagation of the bacteria proceeds in a mash favorable to propagation but unfavorable to fermentation.

*Second.*—The concentration of the volume of mash is increased to 6 to 10% by the addition of a concentrated molasses mash, for example, one of which the sugar content is 25 to 50%, and the resultant concentrated mash is fermented preferably at a temperature approximating 37° C., until the virility of the bacteria is well spent. The concentration of the mash tends to inhibit further propagation of the bacteria while facilitating fermentation so that a high percentage of the sugar in the molasses is usefully fermented.

*Third.*—A fresh supply of seed mash containing virile bacteria sufficient to complete the fermentation of the fermentable sugar is added and fermentation continued until completed.

In the procedure outlined the volume of the dilute mash in which the bacteria are propagated or to which they are first added is preferably as large as possible as compared with the final maximum volume, that is to say, the original volume is increased relatively little in order that the concentration of bacteria may be reduced as little as possible. The proportions may approximate ninety parts of the dilute molasses mash, ten parts of the first seed mash, ten to twenty-five parts of concentrated molasses and ten parts of the second seed mash. With these proportions it is seen that if the dilute mash contains 2.5% sugar, and the concentrated mash 50% sugar, the mash for the main fermentation will contain 7.5% sugar.

The propagation of bacteria of the first step may be completed in approximately 16 hours and the first fermentation in approximately 8 hours. The second fermentation resulting when the fresh bacteria are added to the partially fermented mash is extremely vigorous. The complete fermentation process may be completed under various conditions in from 12 to 36 hours.

Ordinarily it is not necessary to increase the number of steps of the process to add the bacteria at more than two different stages of the process, but obviously in certain cases such a procedure might be desirable.

It will be noted that in the process as herein outlined the propagative and fermentative functions of the bacteria are separated and the last stage of the fermentation is effected by vigorous and virile bacteria. Several advantages accrue; for example, 1. The available substances of the concentrated mash which are acted upon after the fermentation once begins are completely transformed to fermentation products as the bacteria cells no longer grow, are no longer propagated, do not form spores or other permanent forms, nor accumulate reserve nutrients in their bodies, but only act as a catalytic mass which is completely consumed during fermentation.

2. The fermentation begins at once upon the bringing together of the bacteria and the concentrated mash without a preliminary period of incubation thereafter.

3. The necessity of sterilization of the main fermentable concentrated mash and the difficulties connected therewith, such as the deterioration, by carmelizing, of the substances to be fermented are avoided, the main mash being composed in such a manner that a sensible propagation of bacteria therein is no longer possible. The mash, therefore, is quite immune to infection.

4. The fermentation of the main concentrated mash may be carried out at a temperature different from that of the growing optimum so that the inoculating bacteria after first being developed up to maximum vitality in the nutritive mash can produce its highest fermentative energy when fermenting the main mash.

5. The addition of nutrients to the main mash are unnecessary since no propagation is desired.

6. The fermentation is finally completed by fresh bacteria which are not intoxicated by the intoxicating substances found in the molasses with the result that a more complete fermentation is possible.

Certain details of the process as above outlined will be better understood by reference to applicant's several co-pending applications.

The particular procedure may be varied in detail and may be applied to mashes of various constituents using various bacteria and to produce a large variety of products without departing from the spirit of the invention as defined in the following claims.

I claim:—

1. The method of carrying out fermentation processes which comprises propagating bacteria in a dilute mash favorable to propagation but unfavorable to fermentation, increasing the concentration of the mash sufficiently to inhibit the propagation of the bacteria while providing a mash favorable to fermentation, fermenting the concentrated mash, and adding fresh bacteria and further fermenting the mash.

2. The method of carrying out fermentation processes which comprises adding bacteria to a volume of dilute nutrient mash favorable to propagation of bacteria but unfavorable to fermentation and propagating said bacteria, adding to the volume of dilute mash a relatively small volume of concentrated mash to increase the concentration of said dilute mash without substantially increasing the volume thereof to provide a mash unfavorable to propagation but favorable to fermentation, fermenting said concentrated mash, adding fresh bacteria and further fermenting said mash.

3. The method of carrying out fermentation processes which comprises adding to a volume of dilute saccharine mash a seed mash of amylaceous material containing bacteria, propagating the bacteria until they attain maximum vitality, adding saccharine material to increase the concentration of the mash to 6 to 10% and fermenting the mash until the bacteria are exhausted, adding fresh bacteria and fermenting the mash until the bacteria are exhausted.

4. The process of effecting fermentation of a mash which is fermentable by the organisms to be utilized but which is unfavorable to cell growth or multiplication of said organisms, which comprises cultivating said organisms in a medium favorable to cell growth and multiplication until a culture is secured which possesses sufficient enzymatic activity to ferment the major portion of the main mash without the necessity for further cell growth or multiplication, inoculating said main mash with said culture, allowing fermentation to proceed, and subsequently adding additional culture in mash favorable to cell growth and multiplication and allowing fermentation to proceed to completion.

5. The process of effecting fermentation of a molasses mash which is fermentable by the organisms to be utilized, but which is unfavorable to cell growth or multiplication of said organisms, which comprises cultivating said organisms in a dilute molasses mash favorable to cell growth and multiplication until a culture is secured which possesses sufficient enzymatic activity to ferment the major portion of the main mash without the necessity for further cell growth or multiplication, inoculating said main mash with said culture, allowing fermentation to proceed, and subsequently adding additional culture in mash favorable to cell growth and multiplication and allowing fermentation to proceed to completion.

6. The process of effecting fermentation of a concentrated saccharine mash which is fermentable by the organisms to be utilized but which is unfavorable to cell growth or multiplication of said organisms, which comprises cultivating said organisms in a dilute saccharine mash favorable to cell growth and multiplication until a culture is secured which possesses sufficient enzymatic activity to ferment the major portion of the main mash without the necessity for further cell growth or multiplication, inoculating with said culture a sufficient quantity of the main highly concentrated mash to bring the total original sugar concentration of the combined mash to a value of 6–10%, allowing fermentation to proceed, and subsequently adding additional culture in mash favorable to cell growth and multiplication and allowing fermentation to proceed to completion.

7. The process of effecting fermentation of a mash which is fermentable by butylobacter bacteria but which is unfavorable to cell growth or multiplication of said bacteria, which comprises cultivating said bacteria in a medium favorable to cell growth and multiplication until a culture is secured which possesses sufficient enzymatic activity to ferment the major portion of the main mash without the necessity for further cell growth or multiplication, inoculating said main mash with said culture, allowing fermentation to proceed, and subsequently adding additional culture in mash favorable to cell growth and multiplication and allowing fermentation to proceed to completion.

8. The process of effecting fermentation of a molasses mash which is fermentable by butylobacter bacteria but which is unfavorable to cell growth or multiplication of said bacteria, which comprises cultivating said bacteria in a dilute molasses mash favorable to cell growth and multiplication until a culture is secured which possesses sufficient enzymatic activity to ferment the major portion of the main mash without the necessity for further cell growth or multiplication, inoculating said main mash with said culture, allowing fermentation to proceed, and subsequently adding additional culture in mash favorable to cell growth and multiplication and allowing fermentation to proceed to completion.

9. The process of effecting fermentation of a concentrated saccharine mash which is fermentable by butylobacter bacteria but which is unfavorable to cell growth or multiplication of said bacteria, which comprises cultivating said bacteria in a dilute saccharine mash favorable to cell growth and multiplication until a culture is secured which possesses sufficient enzymatic activity to ferment the major portion of the main mash without the necessity for further cell growth or multiplication, inoculating with said culture a sufficient quantity of the main highly concentrated mash to bring the total original sugar concentration of the combined mash to a value of 6–10%, allowing fermentation to proceed, and subsequently adding additional culture in mash favorable to cell growth and multiplication and allowing fermentation to proceed to completion.

In testimony whereof I have affixed my signature to this specification.

STEFAN BAKONYI.